(12) United States Patent
Agazarova

(10) Patent No.: US 7,524,057 B2
(45) Date of Patent: Apr. 28, 2009

(54) FINISHED LEATHER COVERED EYEWEAR DEVICE AND METHOD

(76) Inventor: Mazal Agazarova, 3003 Avenue X, Apt. 5F, Brooklyn, NY (US) 11235

( * ) Notice: Subject to any disclaimer, the term of this patent is extended or adjusted under 35 U.S.C. 154(b) by 61 days.

(21) Appl. No.: 11/820,994

(22) Filed: Jun. 21, 2007

(65) Prior Publication Data

US 2008/0316420 A1    Dec. 25, 2008

(51) Int. Cl.
*G02C 1/00* (2006.01)
(52) U.S. Cl. .................... 351/158; 351/51; 351/122
(58) Field of Classification Search ............ 351/41, 351/51, 52, 122, 123, 158
See application file for complete search history.

(56) References Cited

U.S. PATENT DOCUMENTS

| 3,526,450 | A | * | 9/1970 | Berry ........................... 351/52 |
| 3,930,921 | A | * | 1/1976 | Connett ....................... 156/234 |
| 3,993,403 | A | * | 11/1976 | Brown ......................... 351/178 |
| 4,786,158 | A | * | 11/1988 | Barfus-Shanks et al. .... 351/122 |

* cited by examiner

*Primary Examiner*—Huy K Mai
(74) *Attorney, Agent, or Firm*—Donald W. Meeker

(57) ABSTRACT

A device and method of making eyewear with distinctive leather style and comfort as well as practicality in custom covered, customer covered, or mass produced eyewear coverings utilizing a zipper, snap, or metal button attaching means or by an insert molding in an injection molding process or compression molding process incorporating a normal structural material as well as a finished leather covering material.

19 Claims, 3 Drawing Sheets

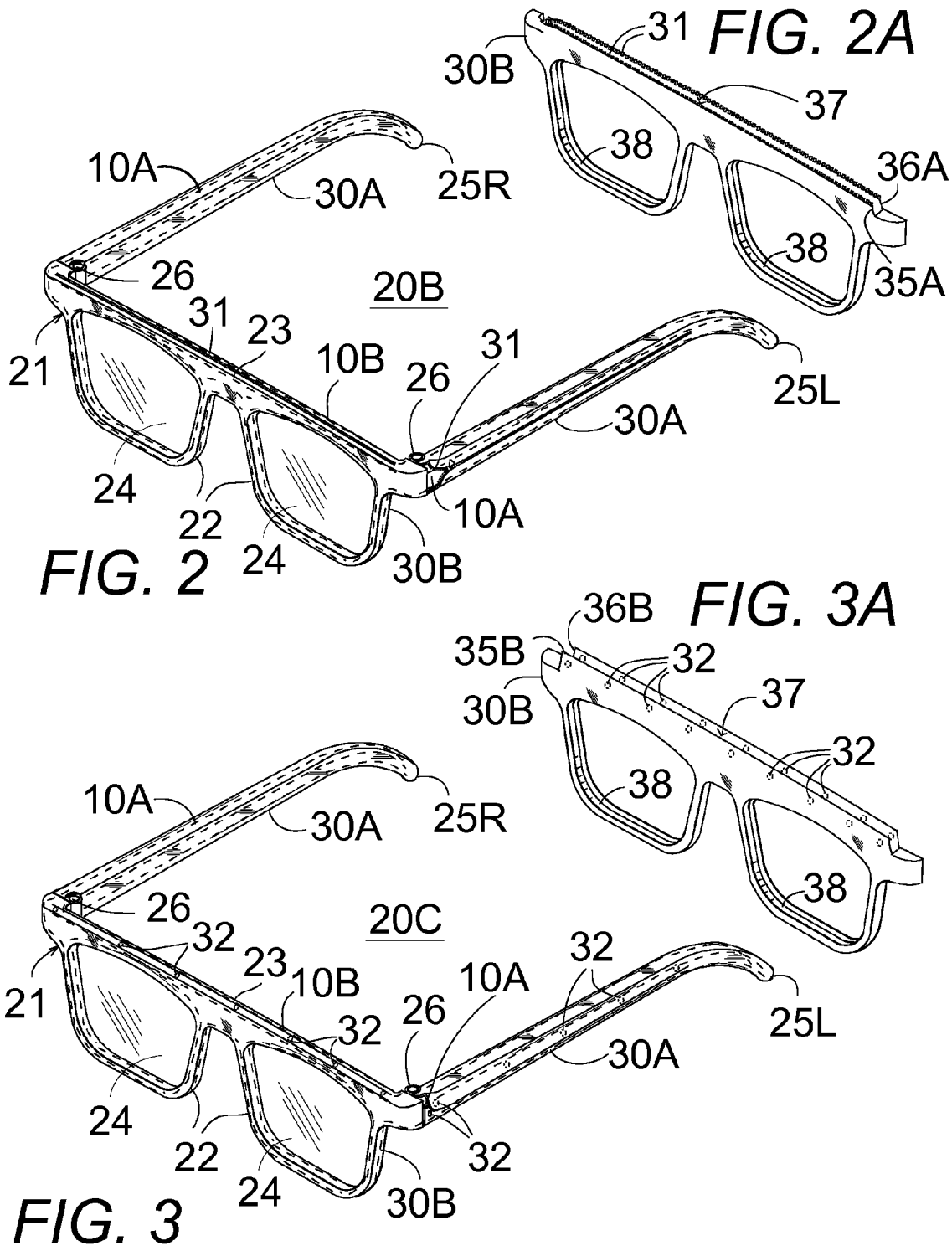

FINISHED LEATHER COVERED EYEWEAR DEVICE AND METHOD

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH OR DEVELOPMENT

Not Applicable.

BACKGROUND OF THE INVENTION

1. Field of the Invention

The present invention relates to eyewear and particularly to a covered eyewear device with a hard structural interior and soft leather finish outer covering, the outer covering comprising a leather finish material sufficiently soft to rest comfortably against the skin of a user and sufficiently smooth on at outer surface to resist moisture and be easily wiped clean to form eyewear having a distinctive finished leather look and comfort on the exterior and a durable inner support structure. leather or patent leather cover for the frame and temple arms for eyewear, which cover may be installed over existing or new eyewear or formed by insert molding in an injection molding or compression 20 molding mass production of eyewear or by installing a covering over existing eyewear.

2. Description of Related Art Including Information Disclosed Under 37 CFR 1.97 and 1.98

Eyewear comes in many styles and with many coverings, coatings, and attachments decorative or functional in purpose. Normally the outer surface of eyewear is hard and smooth being fabricated of a synthetic type of plastic or metal. Some portions of eyewear in prior art devices are formed with a soft outer portion around the parts in contact with the nose of the wearer to soften that contact and the remainder of the eyewear frame and temple arms hard for durability and retention functionality. There were some prior art patents which mention leather covered, fur covered and fabric covered eyewear frames primarily associated with warmth and comfort of the wearer in cold weather. There were also many prior art patents for ways of attaching the coverings and different design components to eyewear.

Prior art eyewear seems to be lacking a device and methodology for producing eyewear with distinctive style and comfort as well as practicality in mass produced or custom produced or customer attached eyewear coverings.

U.S. Pat. No. 6,196,681, issued Mar. 6, 2001 to Canavan, discloses a unitary structure made by a two-shot process in a single mold wherein a hard frame member is molded to which a secondary soft material is molded and chemically bonded to form soft contact areas along the inner portion of the brow bar and at the nose portions. In this manner, a soft material is provided to contact the wearer while hard material is provided to engage ratchet adjustment pieces as well as a transparent lens structure adapted to cover the eyes of a wearer.

U.S. Pat. No. 4,798,453, issued Jan. 17, 1989 to Tokumaru, provides an eyeglass frame and process for injection molding same. The frame of eyeglasses is produced by injection molding of a synthetic resin whose principle material is a polyarylate resin, a decorative coating layer on part or over the entire portion of the surface of the frame of eyeglasses, and a coating film is heat-hardened together with the frame of eyeglasses at about 130 degrees to 150 degrees C.

U.S. Pat. No. 4,955,706, issued Sep. 11, 1990 to Schmidthaler, shows a composite, integral polymeric spectacle part. The spectacle part includes a first polymer member and a second polymer member. The polymer members are selected to provide desired characteristics for the spectacle part at the location of the spectacle part where the member is incorporated. In a particular embodiment, it is desirable that the first polymeric member be formed from an elastomeric polymer and that the second member be a substantially rigid polymer. The rigid polymer is preferably formed from a thermosetting polymer having a higher melting temperature than the first elastomeric member. The second rigid member is bound to the first polymer member by heat fusion during an injection molding process. In the method of the invention for forming a composite, integral, polymeric spectacle part, a first polymer member is formed into a shape conforming to a portion of the cavity of an injection mold. The entire shape of the injection mold cavity defines the finished spectacle part. After the first polymeric member is inserted into the cavity portion, a second melted polymer, which has been heated to a suitable temperature above its melting temperature, is injected into the injection mold cavity so as to fill the cavity. The first polymer member and the second injected polymer are in abutting relationship in the injection mold cavity. A composite, integral polymeric spectacle part is prepared by activation and fusion of the first preformed polymer member by the heated second polymer.

U.S. Pat. No. 4,655,564, issued Apr. 7, 1987 to Czech, claims the making of spectacle frames and parts by means of injection molding, in which the plastic is selected from the group consisting of polyetherimide and polyethersulfone.

U.S. Pat. No. 3,406,232, issued Oct. 15, 1968 to Barker, describes a method for molding eyeglass frames and particularly to a lens frame having a lens holding groove therein.

U.S. Pat. No. 1,510,001, issued Sep. 30, 1924 to Gunning, discloses the method of making an ophthalmic mounting having a metallic frame enclosed in a cellulose molded frame.

U.S. Pat. No. 3,649,106, issued Mar. 14, 1972 to Hirschmann, Jr., indicates a manually formable reinforced spectacle temple includes a reinforcing wire enclosed within front a rear sections of plastic of relatively different properties. The front section is hard and resistant to deformation, while the rear section is soft and readily formable manually with the wire to fit the ear and head of the wearer. The two plastic sections are mechanically interlocked, and the rear section may be rotated on the reinforcing wire to accommodate the slope of the portion of the wearer's head with which it is in engagement. To form the temple, a wire is positioned within the mold at its desired location, and a fluid plastic molding compound such as polyvinyl chloride is injected into the cavity.

U.S. Pat. No. 5,331,355, issued Jul. 19, 1994 to Frank, puts forth a method for manufacturing plastic frames for eyeglasses, wherein a plastic blank is provided with formed portions in the area where protruding parts of the finished plastic frame are located. Preferably, these formed portions are injection molded onto the plastic blank.

U.S. Pat. No. 4,265,850, issued May 5, 1981 to Coulon, concerns the process and apparatus for the production of spectacle frame parts of synthetic material, for example, of polyurethane. The faces are molded between two casting half-moulds each comprising a plate having an impression on one surface thereof. Each plate has a substantially equal thickness at every point and is made of a polyolefine. Use of such half-moulds enables the faces of spectacle frames to be directly molded into their final shape.

U.S. Pat. No. 7,175,270, issued Feb. 13, 2007 to Curci, illustrates a flexible frame assembly for eyeglasses created using a two shot molding process. A novel frame construction for eyeglasses is provided wherein the upper frame member is formed to have greatly enhanced flexibility to increase the overall adjustability, comfort and fit of the eyeglasses. The upper frame member includes areas wherein the material is selectively weakened to create predetermined flex points periodically within the frame member. Additionally, the weakened areas may be filled and/or covered with a second material that is more flexible than the base material used to form the frame member. The enhanced flexibility allows the upper frame member to flex as the temple members of the eyeglasses are stretched outwardly providing a comfortable fit for a wide range of wearers. Further, the top edge of the eyeglass lens may include formations that provide clearance for the deflection of the top frame member.

U.S. Pat. No. 2,746,087, issued May 22, 1956 to Dolezal, is for a method of manufacturing of spectacle hinges using plastics capable of molecular orientation by cold working, such as polyurethane and polyvinyl chloride.

U.S. Pat. No. 3,582,193, issued Jun. 1, 1971 to Bogyos, provides athletic eye spectacles having a frame including a lens-holding piece and temples. The frame includes a covering of a coating material which is soft and resilient, while the frame has an inner core of a harder material for properly supporting the lenses. The coating material is sufficiently resilient or soft so that if the spectacles are hit, the wearer will not be injured, nor will the person who strikes the spectacles. The spectacles are made by placing the inner or base frame in a mold, and the coating material is poured into the mold in liquid form and is permitted to set around the base frame. Finally, the temple pieces are also coated and affixed to the lens-holding frame piece.

U.S. Pat. No. 2,516,373, issued Jul. 25, 1950 to Ehlert, claims a mold for making plastic integral frames and lenses in a single molding operation.

U.S. Pat. No. 4,729,650, issued Mar. 8, 1988 to Jennings, indicates a pair of removable sunglasses which can be attached to conventional eyeglasses or spectacles. The sunglasses include a pair of lenses joined by a center section which functions as both a hinge and means for attaching the sunglasses to the bridge of the eyeglasses. They also include a pair of opposing side pieces attached to respective lenses by a hinge which are removably attachable to the bows of the eyeglasses. Each side piece is a laminated assembly made of fabric.

U.S. Pat. No. 3,526,450, issued Sep. 1, 1970 to Berry, is for an ornamental ribbon covering for eyeglasses which is attached to the eyeglasses by elastically embracing the eyeglasses frame. The covering forms an elastic envelope about the associated framework for supporting various ornamental and decorative indicia and characters upon the envelope.

U.S. Pat. No. 5,181,051, issued Jan. 19, 1993 to Townsend, provides a magnetic removable display for eyeglasses which may be made of a fabric coating to match clothing. A pair of specified metal glasses is provided for displaying removable magnetic printed matter includes a frame for supporting the lens of the pair of glasses. The frame is of a predetermined thickness for displaying removable printed matter thereon. Temples are provided for extending from the frame for supporting the glasses relative to a wearer's ears. The temples are of a predetermined thickness for displaying removable printed matter thereon. A retaining member is provided for temporarily retaining printed matter relative to at least the frame or the temples for predominantly displaying the printed matter for viewing by others. The retaining member may include a plurality of grooves disposed within a thickness of the frame and temples for mating with corresponding projections extending from the removable printed matter. The retaining member may include a plurality of projections extending from the frame and temples for mating with corresponding grooves disposed within a thickness of the removable printed matter. The retaining member may be a specified metal wherein the removable printed matter is attracted to and temporarily retained on the frames and temples of the glasses.

U.S. Pat. No. 6,139,144, issued Oct. 31, 2000 to Hynansky, shows a cold weather eyeglass system comprising conventional eyeglasses and a cold weather protective shield in either one combined unit or in a removable form. The shield component may be a covering selected from the group consisting of fabric, fur, and fabric-covered and fur-covered materials. The shield component may be integrally attached to the eyeglass frame or be releasably attached to a standard-style eyeglass frame (either of which can be fitted with standard size and shape prescription lenses), to provide protection against cold weather. The preferred embodiment of the removable assembly includes a one-piece member having side retaining members with the member serving as the frame, side retaining members, and a top retaining member.

Two U.S. patent applications, #20060244901 and #20060244899 published Nov. 2, 2006 by Maling, and one U.S. Pat. No. 7,101,039, issued Sep. 5, 2006 to Maling, all illustrate a durable eyeglasses frame allowing sizing, assembly and disassembly without the need for special training, screws, bolts, or pins, or special tools. Maling mentions the frame could be made of leather.

U.S. Pat. No. D533,888, issued Dec. 19, 2006 to Murphy, claims the ornamental design for fabric-wrapped sunglasses with attached baseball cap.

U.S. Pat. No. D534,567, issued Jan. 2, 2007 to Murphy, describes the ornamental design for fabric-wrapped sunglasses with attached sun hat.

U.S. Pat. No. D534,940, issued Jan. 9, 2007 to Murphy, discloses the ornamental design for a plush sunglasses with attached cap.

U.S. Pat. No. D503,736, issued Apr. 5, 2005 to Cleary, indicates the ornamental design for a goggle frame covered with leather.

U.S. Pat. No. D146,237, issued Jan. 14, 1947 to Sills, puts forth the ornamental design for a pair of eyeglasses.

U.S. Pat. No. 3,140,390, issued Jul. 7, 1964 to Smith, illustrates therapeutic heated appliance having a spectacle-like body with heated rims which are covered with a soft flannel cloth.

U.S. Pat. No. 3,993,403, issued Nov. 23, 1976 to Brown, is for an insulated fitting sheath for eyeglass temples. Protective, removable, flexible insulated fabric sheaths are employed on heat-softened temples of eyeglasses during fitting of the glasses to the head of the wearer to prevent injury or discomfort to the wearer. The temples are allowed to cool and harden while held in position on the head.

U.S. Pat. No. 1,524,321, issued Jan. 27, 1925 to Stevens, provides a spectacle temple where flexibility is attained utilizing a flexible reinforcing rod. The rod is covered with a fabric, preferably in the form of a tube, which is slipped over the rod. The fabric is then enclosed in a non-metallic member for aesthetic reasons. The non-metallic member is bored to form a tube, whereby the rod may be extended through the bore to reinforce the fabric and the non-metallic member. The fabric and the reinforcing rod may be bent to the desired shape of the temple either before or after the non-metallic tube is applied.

U.S. Pat. No. 5,440,355, issued Aug. 8, 1995 to Ross, shows a protective eyeglass cover for the temples and ear-pieces of a pair of eyeglasses. The protective cover includes a pair of fabric sleeve members with each of the sleeve members having a hollow interior and an opening at a first end extending into the hollow interior. Each of the sleeve members is configured to receive one of the temple and earpieces of the eyeglasses within the hollow interior through the opening. The protective cover increases the comfort to the user as well as tightening the grip of the eyeglasses.

U.S. Pat. No. 6,789,897, issued Sep. 14, 2004 to Smith, shows a sports theme, hands-free binocular glasses having an eyeglass frame, a binocular device, and an ornamental device, where the ornamental device has an overall shape which is substantially the shape of a sports-related device, and where the ornamental device has an opening which allows light to pass through the opening and into the binocular device. The ornamental device may be hollow and adapted to enclose the binocular device, and may comprise a first design element, where the first design element has a first design element shape which is substantially the shape of an attribute of the sports-related device. The sports theme hands-free binocular glasses may be adapted for use as a hands-free device. Also, hands-free binocular glasses having an eyeglass frame, a binocular device, a decorative element and a design element. The design element may be a sports element made from natural leather, manmade leather, pigskin, plastic, rubber, felt, etc., or may be flocking made from natural or synthetic fur, natural or synthetic feathers, felt and the like.

Two U.S. Pat. No. 6,957,890 issued Oct. 25, 2005 and U.S. Pat. No. 6,543,894 issued Apr. 8, 2003 to Shapiro, describe eyeglasses that are converted in appearance by a cover clip-on for part of the front portion of the frame of the eyeglasses. A set of eyewear combines the eyeglasses with the cover clip-on. The set may be enlarged by provision of a sunglasses clip-on and/or temple coverlets. A cover clip-on can mask the top and bottom eye rims of the eyeglasses or have a strip form, with top eye rim cover sections, possibly interconnected by a bridge. The strip is assembled with the eyeglasses mechanically and/or magnetically.

U.S. Pat. No. 3,542,460, issued Nov. 24, 1970 to Smith, is for a snap-together frame permitting a user to exchange one frame for another for decorative reasons.

U.S. Pat. No. 2,786,391, issued Mar. 26, 1957 to Lutes, provides a lens frame subassembly which is mountable in a larger brow piece assembly, to accomplish a change in fashion from one brow piece assembly to another. The lens frame subassembly is mounted using a pin and socket system.

U.S. Pat. No. 5,371,554, issued Dec. 6, 1994 to Aspesi, shows an eyeglass frame restyling assembly having grooves arranged in the lens, the grooves receiving a replaceable U-shaped channel for changing the style and or color of a frame around an eyeglass lens. The lenses may have a groove to permit the exchange of a frame portion of the eyeglass assembly.

U.S. Pat. No. 2,835,063, issued May 20, 1958 to Worthington, claims a removable ornamental brow cover for spectacle frames.

U.S. Pat. No. 2,743,543, issued May 1, 1956 to Goddard, describes clip-on ornamental attachments for eyeglasses frames.

U.S. Pat. No. 3,517,415, issued Jun. 30, 1970 to McGrath, discloses a flexible plastic glasses cover which snaps over the spectacle frame U.S. Pat. No. 2,482,195, issued Sep. 20, 1949 to Martin, indicates a removably mounted ornamental strip for an eyeglass frame which provides the ability to change color scheme of the glasses.

U.S. Pat. No. D365,838, issued Jan. 2, 1996 to Moore, puts forth the ornamental design for a style changeable eyewear.

U.S. Pat. No. D167,526, issued Aug. 19, 1952 to Murphy, concerns the ornamental design for an ornamental clip for eyeglasses.

U.S. Pat. No. D354,502, issued Jan. 17, 1995 to Mekari, illustrates the ornamental design of an eyeglass frame attachable/detachable glass guard.

U.S. Pat. No. 4,981,350, issued Jan. 1, 1991 to Vitaloni, is for a sectional moldable spectacle frame. The spectacle frame comprises a hollow U-shaped base structure with bars pivotally mounted at the ends thereof and a pair of lever members pivotally mounted in the middle of the base structure and attachable by snap action to the upside of the base structure. Decorative eyebrow members are attachable by snap action of projections and recesses to the lever members.

U.S. Pat. No. 3,179,950, issued Apr. 20, 1965 to Gross, provides a spectacle frame with detachable ornamental brow-bars.

U.S. Pat. No. 2,599,463, issued Jun. 3, 1952 to Lamb, claims an attachment for eyeglasses which comprises a pair of interconnected, detachable, ornamental brow-bars which are friction fit on the eyeglasses.

U.S. Pat. No. 4,070,103, issued Jan. 24, 1978 to Meeker, discloses a spectacle frame with attachable one-piece slide-on rim which allows the wearer of eye glasses to change a single pair of glasses to match any individual fashion or mood. The basic spectacle unit is a combination of two lens, two lens rims, two temple members and a nose bridge. To complete the combination there are a number of attachable pairs of one-piece lens rim covers of various colors, designs, shapes and materials. The easily slid on lens rim covers are securely held in position by a lip, friction tape, magnetic strips or a snap-on type of friction fitting arrangement. Tinted lens may be inserted in the individual pairs of lens rim covers in order to transform normal spectacles into sunglasses. In addition, the lens rim covers may be designed to affect a change in the shape of the actual lens itself from, for instance, the standard elliptical shape to a more high fashion octagonal square or rectangular shape.

What is needed is a device and methodology for producing eyewear with distinctive style and comfort as well as practicality in custom covered, customer covered, or mass produced eyewear coverings utilizing a zipper, snap, or metal button attaching means or by an insert molding in an injection molding process or compression molding process incorporating a normal structural material as well as a simulated fabric covering material, such as an artificial leather or patent leather material.

BRIEF SUMMARY OF THE INVENTION

An object of the present invention is to provide a device and methodology for producing eyewear with distinctive style and comfort as well as practicality in custom covered, customer covered, or mass produced eyewear coverings utilizing a zipper, snap, or metal button attaching means or by an insert molding in an injection molding process or compression molding process incorporating a normal structural material as well as a simulated fabric covering material, such as an artificial leather or patent leather material.

Another object of the present invention is to provide a patent leather outer surface on eyewear for a waterproof and weather proof, wipe clean soft and shiny surface with a material appeal and style.

In brief, a leather or patent leather cover for the frame and temple arms for eyewear, which cover may be installed over existing or new eyewear by a zipper, snap, or metal button or formed by insert molding in an injection molding or compression molding mass production of eyewear.

An advantage of the present invention is that it provides a distinctive finished leather look and style to eyewear which is comfortably soft on the skin of the wearer and easily wiped clean.

Another advantage of the present invention is that the finished leather covered eyewear may be custom covered, customer covered, or mass produced.

BRIEF DESCRIPTION OF THE SEVERAL VIEWS OF THE DRAWINGS

These and other details of my invention will be described in connection with the accompanying drawings, which are furnished only by way of illustration and not in limitation of the invention, and in which drawings:

FIG. 2 is a perspective view of the finished leather covered eyewear of the present invention with the form-fit finished leather covering attached to the eyewear frame and temple arms by zippers;

FIG. 2A is a perspective view of the form-fit finished leather covering for the eyewear frame to be attached by a zipper;

FIG. 3 is a perspective view of the finished leather covered eyewear of the present invention with the form-fit finished leather covering attached to the eyewear frame and temple arms by snaps;

FIG. 3A is a perspective view of the form-fit finished leather covering for the eyewear frame to be attached by snaps;

DETAILED DESCRIPTION OF THE INVENTION

In FIGS. 1-4, a covered eyewear device 20A-20D with a frame 21 and temple arms 25L and 25R has a hard structural interior frame 10B attached by hinges 26 to hard structural interior temple arms 10A both covered by soft finished leather outer coverings 30B and 30A respectively.

The inner eyewear frame 10B and pair of temple arms 10A is formed of structural material to support a pair of lenses 24 attached in the frame and to withstand normal usage in being worn by a user.

The eyewear frame outer covering 30B and pair of temple arms outer coverings 30A comprise a leather finish material sufficiently soft to rest comfortably against the skin of a user and sufficiently smooth on at outer surface to resist moisture and be easily wiped clean to form eyewear having a distinctive finished leather look and comfort on the exterior and a durable inner support structure.

Figure 1:
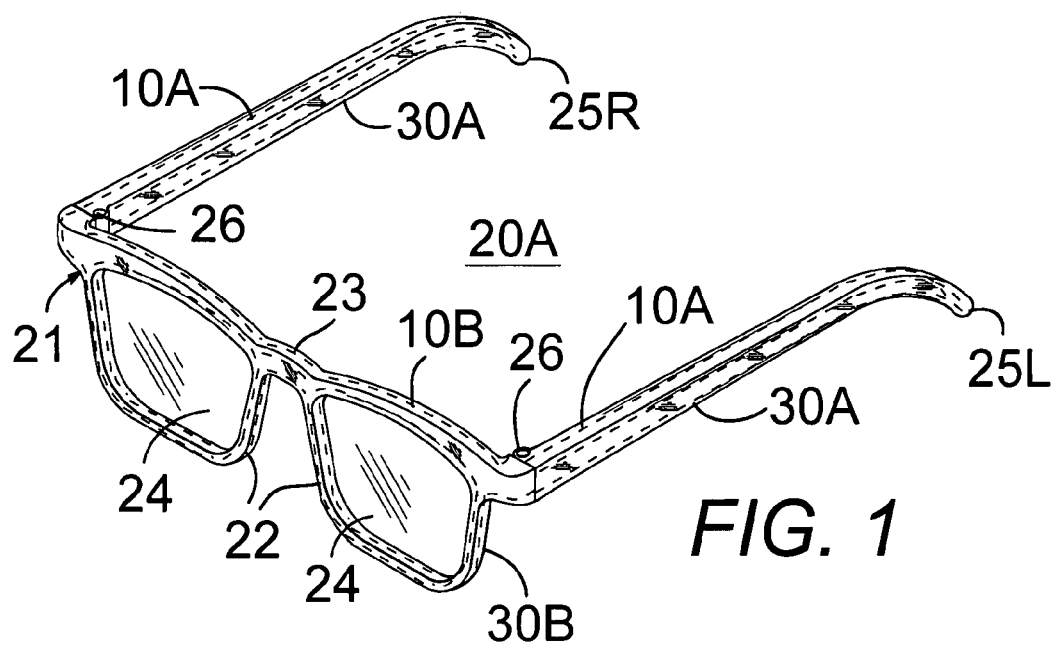
FIG. 1 is a perspective view of the finished leather covered eyewear of the present invention with the form-fit finished leather covering formed by a molding process.

In FIG. 1, the leather finish material is formed as the eyewear frame outer covering 30B and pair of temple arms outer covering 30A during a mass production molding process to create the eyewear device 20A. The device molding process comprises at least one molding process taken from the list of molding processes including insert molding, injection molding, and compression molding.

The eyewear frame and pair of temple arms are fabricated of at least one synthetic material taken from the list of synthetic materials including a molded plastic, an injection molded thermoplastic, a compression molded thermoset plastic, and a molded resin.

The leather material for the coverings 30A and 30B may be insert molded onto the interior plastic eyewear frame 10B and pair of temple arms 10A during an injection molding process to create a molded outer finished leather surface thereon. Synthetic leather material for the coverings 30A and 30B such as vinyl chloride or polyvinyl chloride may be insert molded over polyurethane interior frame 10B and interior temple arms 10A to create a form fitting outer finished leather surface on the eyewear device 20A.

The leather material for the coverings 30A and 30B may be alternately be laminated onto an interior plastic eyewear frame 10B and interior pair of temple arms 10A in a compression molding process to create a form fitting outer finished leather surface thereon. Real patent leather, genuine leather, vinyl chloride, polyvinyl chloride, rayon, acrylics, nylon, or polyester may be compression molded over a thermo-set plastic, such as polypropylene or polystyrene, or metal interior frame 10B and interior temple arms 10A to create a form fitting outer finished leather surface on the eyewear device 20A.

In FIGS. 2 and 2A, a finished leather covering, including patent leather or other materials, as a frame covering 30B or temple arm covering 30A is attached to an interior eyewear frame 10B and interior pair of temple arms 10A by zippers 31. Outer temple arm sleeve covers 30A are zipped on by zippers 31, preferably along the sides, as shown in FIG. 2, and outer frame sleeve covers 30B, as shown in FIGS. 2 and 2A, with form-fitting frame sleeves 34 and a top opening 37 is pulled up over the inner frame 10B and the two flaps 35A and 36A zipped tightly closed by the zipper 31, preferably along the top of the frame 21, to create a form fitting outer finished leather surface on the eyewear device 20B.

In FIGS. 3 and 3A, a finished leather covering, including patent leather or other materials, as a frame covering 30B or temple arm covering 30A is attached to an interior eyewear frame 10B and interior pair of temple arms 10A by snaps 32. Outer temple arm sleeve covers 30A are snapped on by snaps 31, preferably along the outside, as shown in FIG. 3, and outer frame sleeve covers 30B, as shown in FIGS. 3 and 3A, with form-fitting frame sleeves 34 and a top opening 37 is pulled up over the inner frame 10B and the two flaps 35B and 36B snapped tightly closed by the snaps 32, preferably along the top of the frame 21, to create a form fitting outer finished leather surface on the eyewear device 20B.

Figures 4, 4A:
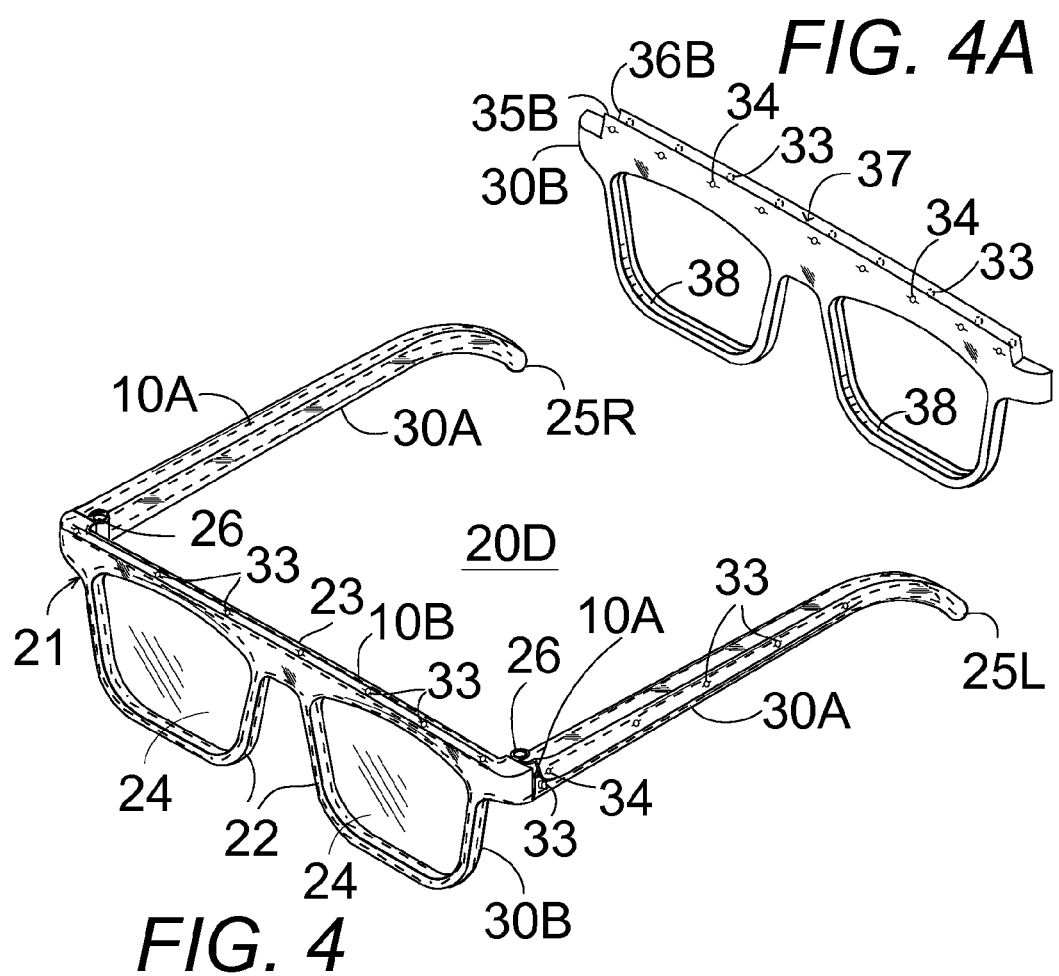
FIG. 4 is a perspective view of the finished leather covered eyewear of the present invention with the form-fit finished leather covering attached to the eyewear frame and temple arms by metal buttons.
FIG. 4A is a perspective view of the form-fit finished leather covering for the eyewear frame to be attached by metal buttons.

In FIGS. 4 and 4A, a finished leather covering, including patent leather or other materials, as a frame covering 30B or temple arm covering 30A is attached to an interior eyewear frame 10B and interior pair of temple arms 10A by metal buttons 33 through slotted openings 34. Outer temple arm sleeve covers 30A are buttoned by metal buttons 33, preferably along the outside, as shown in FIG. 3, and outer frame sleeve covers 30B, as shown in FIGS. 3 and 3A, with form-fitting frame sleeves 34 and a top opening 37 is pulled up over the inner frame 10B and the two flaps 35B and 36B buttoned tightly closed by the buttons 33, preferably along the top of the frame 21, to create a form fitting outer finished leather surface on the eyewear device 20B.

In FIG. 1, the finished leather coverings 30A and 30B are attached to the inner temple arms 10A and inner frames 10B during mass production of new eyewear devices 20A.

In FIGS. 2-4, the finished leather coverings 30A and 30B may be attached to the inner temple arms 10A and inner frames 10B during mass production of new or existing eyewear devices 20B-20D, so that a user may buy just the coverings 30A and 30B and attach them to existing eyewear or buy pre-covered eyewear custom made or mass produced.

The outer covering may comprise at least one of the features taken from a list of features comprising at least one coloring agent, multiple coloring agents, at least one visual pattern, at least one textural pattern, at least one design shape, at least one style feature, and at least one dimensional size feature in addition to the size variations provided by the interior frame, so that the glasses may come in a variety of sizes, styles, colors, multi-colors, designs, patterns, and various other qualities may be made with the present invention on all types of eyewear including designer eyewear and Hollywood style thick glasses and sunglasses.

In practice, a covered eyewear method for making eyewear with a hard structural interior and soft leather finish outer covering comprises:

Forming an inner eyewear frame and pair of temple arms formed of structural material to support a pair of lenses attached in the frame and to withstand normal usage in being worn by a user; and Forming an outer covering on an exterior of an eyewear frame and pair of temple arms, the outer covering comprising a leather finish material sufficiently soft to rest comfortably against the skin of a user and sufficiently smooth on at outer surface to resist moisture and be easily wiped clean to form eyewear having a distinctive finished leather look and comfort on the exterior and a durable inner support structure.

The method may comprise forming an outer covering comprising a leather finish material on an exterior of the eyewear frame and pair of temple arms during a mass production molding process.

The method may comprise forming an outer covering comprising a leather finish material on an exterior of the eyewear frame and temple arms using at least one molding process taken from the list of molding processes including insert molding, injection molding, and compression molding.

The method may comprise the eyewear frame and pair of temple arms being fabricated of at least one synthetic material taken from the list of synthetic materials including a molded plastic, an injection molded thermoplastic, a compression molded thermoset plastic, and a molded resin.

The method may comprise insert molding the leather finish material onto an exterior of a synthetic material eyewear frame and pair of temple arms during an injection molding process to create a molded outer leather finish surface thereon.

The method may comprise laminating a leather finish material onto an exterior of a synthetic material eyewear frame and pair of temple arms in a compression molding process to create a form fitting outer leather finish surface thereon.

The method may comprise attaching the outer covering, comprising at least one leather finish covering material taken from the list of leather finish cover materials including a synthetic leather finish covering, a patent leather covering, and a natural finished leather covering, to an exterior of a new eyewear frame and pair of temple arms by at least one means for attaching the synthetic leather finish covering taken from the list of means for attaching including zippers, snaps, and metal buttons.

The method may comprise attaching the outer covering, comprising at least one leather finish covering material taken from the list of leather finish covering materials including a synthetic leather finish covering, a patent leather covering, and a natural finished leather covering, to an exterior of an existing eyewear frame and pair of temple arms by at least one means for attaching the natural finished leather covering taken from the list of means for attaching including zippers, snaps, and metal buttons.

The method may further comprise forming the outer covering with at least one of the features taken from a list of features comprising at least one coloring agent or multiple coloring agents added during the molding process, at least one visual pattern formed by adding mixtures of color during the molding process, at least one textural pattern formed by the shape of the mold, at least one design shape formed by the shape of the mold, at least one style feature formed by the shape of the mold, and at least one dimensional size feature formed by the dimensions of the mold in addition to the size variations provided by the interior frame, so that the glasses may come in a variety of sizes, styles, colors, multi-colors, designs, patterns, and various other qualities may be made with the present invention on all types of eyewear including designer eyewear and Hollywood style thick glasses and sunglasses.

It is understood that the preceding description is given merely by way of illustration and not in limitation of the invention and that various modifications may be made thereto without departing from the spirit of the invention as claimed.

What is claimed is:

1. A covered eyewear device with a hard structural interior and soft leather finish outer covering, the device comprising:
    an inner eyewear frame and pair of temple arms formed of structural material to support a pair of lenses attached in the frame and to withstand normal usage in being worn by a user;
    an outer covering on an exterior of the eyewear frame and pair of temple arms, the outer covering comprising a leather finish material sufficiently soft to rest comfortably against the skin of a user and sufficiently smooth on at outer surface to resist moisture and be easily wiped clean to form eyewear having a distinctive finished leather look and comfort on the exterior and a durable inner support structure.

2. The device of claim 1 wherein the outer covering comprises a leather finish material formed on an exterior of the eyewear frame and pair of temple arms during a mass production molding process.

3. The device of claim 2 wherein the molding process comprises at least one molding process taken from the list of molding processes including insert molding, injection molding, and compression molding.

4. The device of claim 2 wherein the eyewear frame and pair of temple arms are fabricated of at least one synthetic material taken from the list of synthetic materials including a molded plastic, an injection molded thermoplastic, a compression molded thermoset plastic, and a molded resin.

5. The device of claim 2 wherein the outer covering comprises a leather finish material insert molded onto an exterior of a synthetic material eyewear frame and pair of temple arms during a mass production injection molding process to create a molded outer leather finish surface thereon.

6. The device of claim 2 wherein the outer covering comprises a leather finish material laminated onto an exterior of a synthetic material eyewear frame and pair of temple arms in a compression molding process to create a form fitting outer leather finish surface thereon.

7. The device of claim 2 wherein the outer covering comprises a leather finish material laminated onto an exterior of a metal eyewear frame and pair of temple arms in a compression molding process to create a form fitting outer leather finish surface thereon.

8. The device of claim 1 wherein the outer covering comprises at least one leather finish covering material taken from the list of leather finish cover materials including a synthetic leather finish covering, a patent leather covering, and a natural finished leather covering attached to an exterior of a new eyewear frame and pair of temple arms by at least one means for attaching the synthetic leather finish covering taken from the list of means for attaching including zippers, snaps, and metal buttons.

9. The device of claim 1 wherein the outer covering comprises at least one leather finish covering material taken from the list of leather finish covering materials including a synthetic leather finish covering, a patent leather covering, and a natural finished leather covering, attached to an exterior of an existing eyewear frame and pair of temple arms by at least one means for attaching the natural finished leather covering taken from the list of means for attaching including zippers, snaps, and metal buttons.

10. The device of claim 1 wherein the outer covering comprises at least one of the features taken from a list of features comprising at least one coloring agent, multiple coloring agents, at least one visual pattern, at least one textural pattern, at least one design shape, at least one style feature, and at least one dimensional size feature.

11. A covered eyewear method for making eyewear with a hard structural interior and soft leather finish outer covering, the method comprising:

forming an inner eyewear frame and pair of temple arms formed of structural material to support a pair of lenses attached in the frame and to withstand normal usage in being worn by a user; and forming an outer covering on an exterior of an eyewear frame and pair of temple arms, the outer covering comprising a leather finish material sufficiently soft to rest comfortably against the skin of a user and sufficiently smooth on at outer surface to resist moisture and be easily wiped clean to form eyewear having a distinctive finished leather look and comfort on the exterior and a durable inner support structure.

12. The method of claim 11 comprising forming an outer covering comprising a leather finish material on an exterior of the eyewear frame and pair of temple arms during a mass production molding process.

13. The method of claim 12 comprising forming an outer covering comprising a leather finish material on an exterior of the eyewear frame and temple arms using at least one molding process taken from the list of molding processes including insert molding, injection molding, and compression molding.

14. The method of claim 12 comprising fabricating the eyewear frame and pair of temple arms of at least one synthetic material taken from the list of synthetic materials including a molded plastic, an injection molded thermoplastic, a compression molded thermoset plastic, and a molded resin.

15. The method of claim 14 comprising insert molding the leather finish material onto an exterior of a synthetic material eyewear frame and pair of temple arms during an injection molding process to create a molded outer leather finish surface thereon.

16. The method of claim 14 comprising laminating a leather finish material onto an exterior of a synthetic material eyewear frame and pair of temple arms in a compression molding process to create a form fitting outer leather finish surface thereon.

17. The method of claim 11 comprising attaching the outer covering, comprising at least one leather finish covering material taken from the list of leather finish cover materials including a synthetic leather finish covering, a patent leather covering, and a natural finished leather covering, to an exterior of a new eyewear frame and pair of temple arms by at least one means for attaching the synthetic leather finish covering taken from the list of means for attaching including zippers, snaps, and metal buttons.

18. The method of claim 11 comprising attaching the outer covering, comprising at least one leather finish covering material taken from the list of leather finish covering materials including a synthetic leather finish covering, a patent leather covering, and a natural finished leather covering, to an exterior of an existing eyewear frame and pair of temple arms by at least one means for attaching the natural finished leather covering taken from the list of means for attaching including zippers, snaps, and metal buttons.

19. The method of claim 11 further comprising forming the outer covering comprises with at least one of the features taken from a list of features comprising at least one coloring agent, multiple coloring agents, at least one visual pattern, at least one textural pattern, at least one design shape, at least one style feature, and at least one dimensional size feature.

* * * * *